US012003270B2

(12) United States Patent
Mansour et al.

(10) Patent No.: US 12,003,270 B2
(45) Date of Patent: Jun. 4, 2024

(54) PASSIVE INTERMODULATION DISTORTION FILTERING

(71) Applicant: Qualcomm Incorporated, San Diego, CA (US)

(72) Inventors: Rimon Mansour, Nazareth (IL); Samel Celebi, West New York, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/469,755

(22) Filed: Sep. 8, 2021

(65) Prior Publication Data
US 2023/0071403 A1   Mar. 9, 2023

(51) Int. Cl.
*H04B 1/50* (2006.01)
*H04L 25/03* (2006.01)

(52) U.S. Cl.
CPC ......... *H04B 1/50* (2013.01); *H04L 25/03891* (2013.01)

(58) Field of Classification Search
CPC .............................. H04B 1/50; H04L 25/03891
See application file for complete search history.

(56) References Cited

U.S. PATENT DOCUMENTS

2004/0240420 A1* 12/2004 Nakai ................... H04B 7/2618
                                                                370/441
2021/0167804 A1    6/2021 Xiao et al.

FOREIGN PATENT DOCUMENTS

WO    2021001800 A1    1/2021

OTHER PUBLICATIONS

3GPP TR 37.808: "3rd Generation Partnership Project, Technical Specification Group Radio Access Network, Passive Intermodulation (PIM) handling for Base Stations (BS) (Release 12)", 3GPP Standard, Technical Report, 3rd Generation Partnership Project, Mobile Competence Centre, 650, Route Des Lucioles, F-06921 Sophia-Antipolis Cedex, France, vol. RAN WG4, No. V12.0.0, Sep. 28, 2013, pp. 1-27, XP051293179, Sections 5-9.
International Search Report and Written Opinion—PCT/US2022/074778—ISA/EPO—dated Nov. 29, 2022, 11 pages.

\* cited by examiner

*Primary Examiner* — Natasha W Cosme
(74) *Attorney, Agent, or Firm* — Colby Nipper (57) ABSTRACT

An apparatus is disclosed for passive intermodulation distortion filtering. The apparatus includes a radio-frequency front-end circuit. The radio-frequency front-end circuit includes a transmit filter circuit and a receive filter circuit. The transmit filter circuit includes a passive circuit configured to combine at least two radio-frequency transmit signals associated with different transmit frequency bands. The transmit filter circuit also includes a filter coupled between the passive circuit and a first feed of an antenna. The filter is configured to attenuate frequencies associated with a receive frequency band. The receive filter circuit is coupled to a second feed of the antenna and is configured to pass the frequencies associated with the receive frequency band.

30 Claims, 7 Drawing Sheets

PASSIVE INTERMODULATION DISTORTION FILTERING

TECHNICAL FIELD

This disclosure relates generally to wireless transceivers and, more specifically, to a filter that attenuates passive intermodulation distortion.

BACKGROUND

An electronic device can communicate with an entity, such as a base station, using radio-frequency signals. These radio-frequency signals enable users to talk with friends, download information, share pictures, remotely control household devices, and receive global positioning information. The base station can utilize a variety of techniques to communicate with multiple electronic devices concurrently and reduce communication delays. For example, the base station can employ frequency-division duplexing (FDD) to enable concurrent transmission and reception on different frequency bands. As another example, the base station can use frequency-division multiple access (FDMA) to concurrently communicate with different electronic devices using different frequency bands. It can be challenging, however, to minimize interference while concurrently transmitting within different transmit frequency bands and receiving in a receive frequency band.

SUMMARY

An apparatus is disclosed that implements passive intermodulation distortion (PIMD) filtering (e.g., passive intermodulation distortion mitigation). The apparatus includes a transmitter and a receiver, which are connected to different feeds of an antenna. The transmitter includes a filter, which is coupled between a transmit antenna feed and other components within the transmitter, such as a passive circuit. The filter has a frequency response that passes frequencies associated with multiple transmit frequency bands and attenuates frequencies associated with one or more receive frequency bands. In this way, the filter can attenuate passive intermodulation distortion within the one or more receive frequency bands. By using separate antenna feeds for transmission and reception and by positioning the filter between the transmit antenna feed and other components within the transmitter, the filter can mitigate passive intermodulation distortion and improve a sensitivity of the receiver.

In an example aspect, an apparatus for filtering is disclosed. The apparatus includes a radio-frequency front-end circuit. The radio-frequency front-end circuit includes a transmit filter circuit and a receive filter circuit. The transmit filter circuit includes a passive circuit configured to combine at least two radio-frequency transmit signals associated with different transmit frequency bands. The transmit filter circuit also includes a filter coupled between the passive circuit and a first feed of an antenna. The filter is configured to attenuate frequencies associated with a receive frequency band. The receive filter circuit is coupled to a second feed of the antenna and is configured to pass the frequencies associated with the receive frequency band.

In an example aspect, an apparatus for filtering is disclosed. The apparatus includes passive means for generating a composite transmit signal by combining multiple radio-frequency transmit signals associated with different transmit frequency bands. The apparatus also includes means for attenuating one or more frequencies within the composite transmit signal that are associated with a receive frequency band to generate a filtered composite transmit signal. The apparatus additionally includes means for transmitting the filtered composite transmit signal using a feed that is separate from another feed used to receive a radio-frequency receive signal associated with the receive frequency band.

In an example aspect, a method for filtering is disclosed. The method includes accepting multiple radio-frequency transmit signals associated with different transmit frequency bands. The method also includes passively combining the multiple radio-frequency transmit signals together to generate a composite transmit signal. The method additionally includes attenuating one or more frequencies within the composite transmit signal that are associated with a receive frequency band to generate a filtered composite transmit signal. The method further includes passing the filtered composite transmit signal to a feed of an antenna that is separate from another feed of the antenna associated with receiving a radio-frequency receive signal. The radio-frequency receive signal is associated with the receive frequency band.

In an example aspect, a radio-frequency front-end circuit is disclosed. The radio-frequency front-end circuit includes a multiplexer and a filter. The multiplexer includes multiple band-pass filters configured to have different frequency responses associated with different transmit frequency bands. The filter is coupled to an output of the multiplexer. The filter is configured to be coupled to a feed of an antenna that is separate from another feed that is to be used to receive a radio-frequency receive signal. The filter is also configured to have a frequency response that represents a combination of the different frequency responses of the multiple band-pass filters.

BRIEF DESCRIPTION OF DRAWINGS

FIG. 3-1 illustrates an example antenna and an example wireless transceiver for passive intermodulation distortion filtering.

FIG. 3-2 illustrates example transmit-receive circuits of a wireless transceiver for passive intermodulation distortion filtering.

DETAILED DESCRIPTION

Frequency-division duplexing (FDD) and frequency-division multiple access (FDMA) enable an entity, such as a base station, to communicate with multiple electronic devices concurrently and reduce communication delays. Concurrently transmitting multiple transmit signals associated with different transmit frequency bands, however, can generate passive intermodulation distortion (PIMD). Passive intermodulation distortion is a form of self-interference that can occur from non-linearities within passive components of the base station. Example passive components include cables (e.g., coaxial cables), switches, splitters, combiners, and filters. The passive intermodulation distortion can also occur from loose or dirty connections, corrosion, or water infiltration.

The passive intermodulation distortion has at least one frequency associated with an intermodulation product of two or more of the transmit frequency bands or with a harmonic of one or more of the transmit frequency bands. Sometimes, the frequency of the passive intermodulation distortion is within a receive frequency band. Consequently, the passive intermodulation distortion can overwhelm and desensitize a receiver, which makes it challenging to receive communications within the receive frequency band.

To reduce the passive intermodulation distortion, some entities use expensive passive components that are less likely to generate passive intermodulation distortion than less expensive ones. Additionally or alternatively, maintenance can be performed more often to address any loose or dirty connections, corrosion, or water infiltration within the entity. This maintenance can be expensive and time consuming.

Other techniques actively compensate for the passive intermodulation distortion. For example, a modem can estimate the passive intermodulation distortion and attenuate the passive intermodulation distortion within a received signal. However, these techniques are complex, often nonlinear in nature, expensive, and sensitive to time misalignments, and they can introduce additional latency.

In contrast, example techniques for implementing passive intermodulation distortion filtering (e.g., passive intermodulation distortion mitigation) are described. An apparatus includes a transmitter and a receiver, which are connected to different feeds of an antenna. The transmitter includes a filter, which is coupled between a transmit antenna feed and other components within the transmitter, such as a passive circuit. The filter has a frequency response that passes frequencies associated with multiple transmit frequency bands and attenuates frequencies associated with one or more receive frequency bands. In this way, the filter can attenuate passive intermodulation distortion within the one or more receive frequency bands. By using separate antenna feeds for transmission and reception and by positioning the filter between the transmit antenna feed and other passive components within the transmitter, the filter can mitigate passive intermodulation distortion and improve a sensitivity of the receiver.

Figure 1:
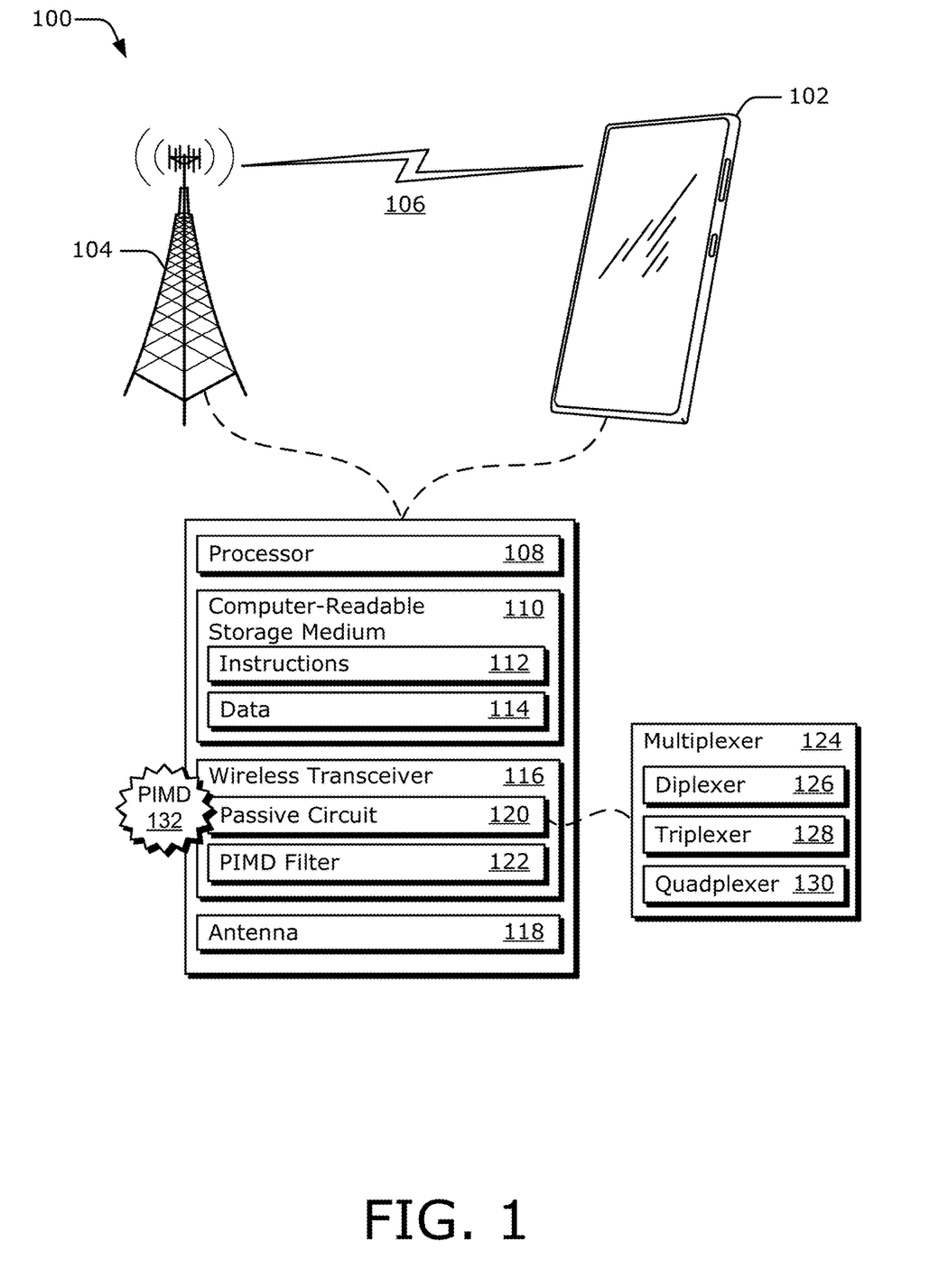
FIG. 1 illustrates an example operating environment for passive intermodulation distortion filtering.

FIG. 1 illustrates an example environment 100 for passive intermodulation distortion filtering. In the environment 100, a computing device 102 communicates with a base station 104 through a wireless communication link 106 (wireless link 106). In this example, the computing device 102 is depicted as a smartphone. However, the computing device 102 can be implemented as any suitable computing or electronic device, such as a modem, a cellular base station, a broadband router, an access point, a cellular phone, a gaming device, a navigation device, a media device, a laptop computer, a desktop computer, a tablet computer, a wearable computer, a server, a network-attached storage (NAS) device, a smart appliance or other internet of things (IoT) device, a medical device, a vehicle-based communication system, a radar, a radio apparatus, and so forth.

The base station 104 communicates with the computing device 102 via the wireless link 106, which can be implemented as any suitable type of wireless link. Although depicted as a tower of a cellular network, the base station 104 can represent or be implemented as another device, such as a satellite, a server device, a terrestrial television broadcast tower, an access point, a peer-to-peer device, a mesh network node, and so forth. Therefore, the computing device 102 may communicate with the base station 104 or another device via a wireless connection.

The wireless link 106 can include a downlink of data or control information communicated from the base station 104 to the computing device 102, an uplink of other data or control information communicated from the computing device 102 to the base station 104, or both a downlink and an uplink. The wireless link 106 can be implemented using any suitable communication protocol or standard, such as 2nd-generation (2G), 3rd-generation (3G), 4th-generation (4G), or 5th-generation (5G) cellular; IEEE 802.11 (e.g., Wi-Fi®); IEEE 802.15 (e.g., Bluetooth®); IEEE 802.16 (e.g., WiMAX®); and so forth. In some implementations, the wireless link 106 may wirelessly provide power, and the base station 104 or the computing device 102 may comprise a power source.

As shown, the computing device 102 and/or the base station 104 includes a processor 108 and a computer-readable storage medium 110 (CRM 110). The processor 108 can include any type of processor, such as a multi-core processor, that executes processor-executable code stored by the CRM 110. The CRM 110 can include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102 and/or the base station 104, and thus does not include transitory propagating signals or carrier waves.

Although not explicitly shown, at least the computing device 102 can also include input/output ports (I/O ports) and a display. The I/O ports enable data exchanges or interaction with other devices, networks, or users. The I/O ports can include serial ports (e.g., universal serial bus (USB) ports), parallel ports, audio ports, infrared (IR) ports, user interface ports such as a touchscreen, and so forth. The display presents graphics of the computing device 102, such as a user interface associated with an operating system, program, or application. Alternatively or additionally, the display can be implemented as a display port or virtual interface, through which graphical content of the computing device 102 is presented.

A wireless transceiver 116 of the computing device 102 and/or the base station 104 provides connectivity to respective networks and other electronic devices connected therewith. The wireless transceiver 116 can facilitate communication over any suitable type of wireless network, such as a wireless local area network (WLAN), peer-to-peer (P2P) network, mesh network, cellular network, wireless wide-area-network (WWAN), and/or wireless personal-area-network (WPAN). In the context of the example environment 100, the wireless transceiver 116 enables the computing device 102 to communicate with the base station 104 and networks connected therewith. However, the wireless transceiver 116 can also enable the computing device 102 and/or the base station 104 to communicate "directly" with other devices or networks.

The wireless transceiver 116 includes circuitry and logic for transmitting and receiving communication signals via an antenna 118. Components of the wireless transceiver 116 can include amplifiers, phase shifters, switches, mixers, analog-to-digital converters, filters, and so forth for conditioning the communication signals (e.g., for generating or processing signals). The wireless transceiver 116 can also include logic to perform in-phase/quadrature (I/Q) operations, such as synthesis, encoding, modulation, decoding, demodulation, and so forth. In some cases, components of the wireless transceiver 116 are implemented as separate transmitter and receiver entities. Additionally or alternatively, the wireless transceiver 116 can be realized using multiple or different sections to implement respective transmitting and receiving operations (e.g., separate transmit and receive chains). In general, the wireless transceiver 116 processes data and/or signals associated with communicating data over the antenna 118.

The wireless transceiver 116 can support multiple frequency bands and share the antenna 118 across multiple transceivers. In some implementations, the wireless transceiver 116 employs techniques such as frequency-division duplexing and/or frequency-division multiple access. Although not explicitly depicted in FIG. 1, the processor 108 or another processor can implement a modem or digital signal processor (DSP) to process received wireless signals or signals that are to be transmitted.

In the example shown in FIG. 1, the wireless transceiver 116 includes a passive circuit 120 and a passive-intermodulation-distortion filter 122 (PIMD filter 122). In some implementations, the passive circuit 120 and the passive-intermodulation-distortion filter 122 can be packaged together. The passive circuit 120 includes one or more passive components, which can operate without being directly connected to a power source or a supply voltage rail. In this manner, the passive circuit 120 does not draw power directly from the power source or the supply voltage rail.

An example passive circuit 120 includes a multiplexer 124, which includes multiple filters. In some implementations, the filters are implemented using cavity filters, which are capable of filtering high-power signals. Example high-power signals have power levels that are approximately 20 watts or more (e.g., 20 watts, 30 watts, or 40 watts). In other implementations, the filters can be implemented using acoustic filters, such as surface-acoustic-wave (SAW) filters or bulk-acoustic-wave (BAW) filters, waveguide filters, or notch filters. The filters can be implemented as low-pass filters, high-pass filters, or band-pass filters. Example band-pass filters are further described with respect to FIGS. 4 and 5.

Example types of multiplexers 124 include a diplexer 126, a triplexer 128, or a quadplexer 130. The diplexer 126 includes two band-pass filters. The triplexer 128 includes three band-pass filters. The quadplexer 130 includes four band-pass filters. Other example passive circuits 120 can include a passive component, such as a cable.

The passive-intermodulation-distortion filter 122 can be implemented using one or more filters. Example filters can include a cavity filter, an acoustic filter (e.g., SAW filter or BAW filter), a waveguide filter, or a notch filter. In general, the passive-intermodulation-distortion filter 122 has a frequency response that represents a combination of the frequency responses of the filters of the multiplexer 124. In particular, the frequency response of the passive-intermodulation-distortion filter 122 can pass frequencies that are passed by the multiplexer 124. The frequency response of the passive-intermodulation-distortion filter 122 can also reject frequencies that are associated with receive frequency bands, as further described below.

Non-linearities associated with the passive circuit 120 can produce passive intermodulation distortion 132 (PIMD 132). The passive-intermodulation-distortion filter 122 can perform, at least in part, passive intermodulation distortion filtering, which attenuates the passive intermodulation distortion 132 present within one or more receive frequency bands. By attenuating the passive intermodulation distortion 132, the passive-intermodulation-distortion filter 122 can improve the sensitivity of the wireless transceiver 116 for receiving signals within the receive frequency band. The passive intermodulation distortion 132 is further described with respect to FIG. 2.

Figure 2:
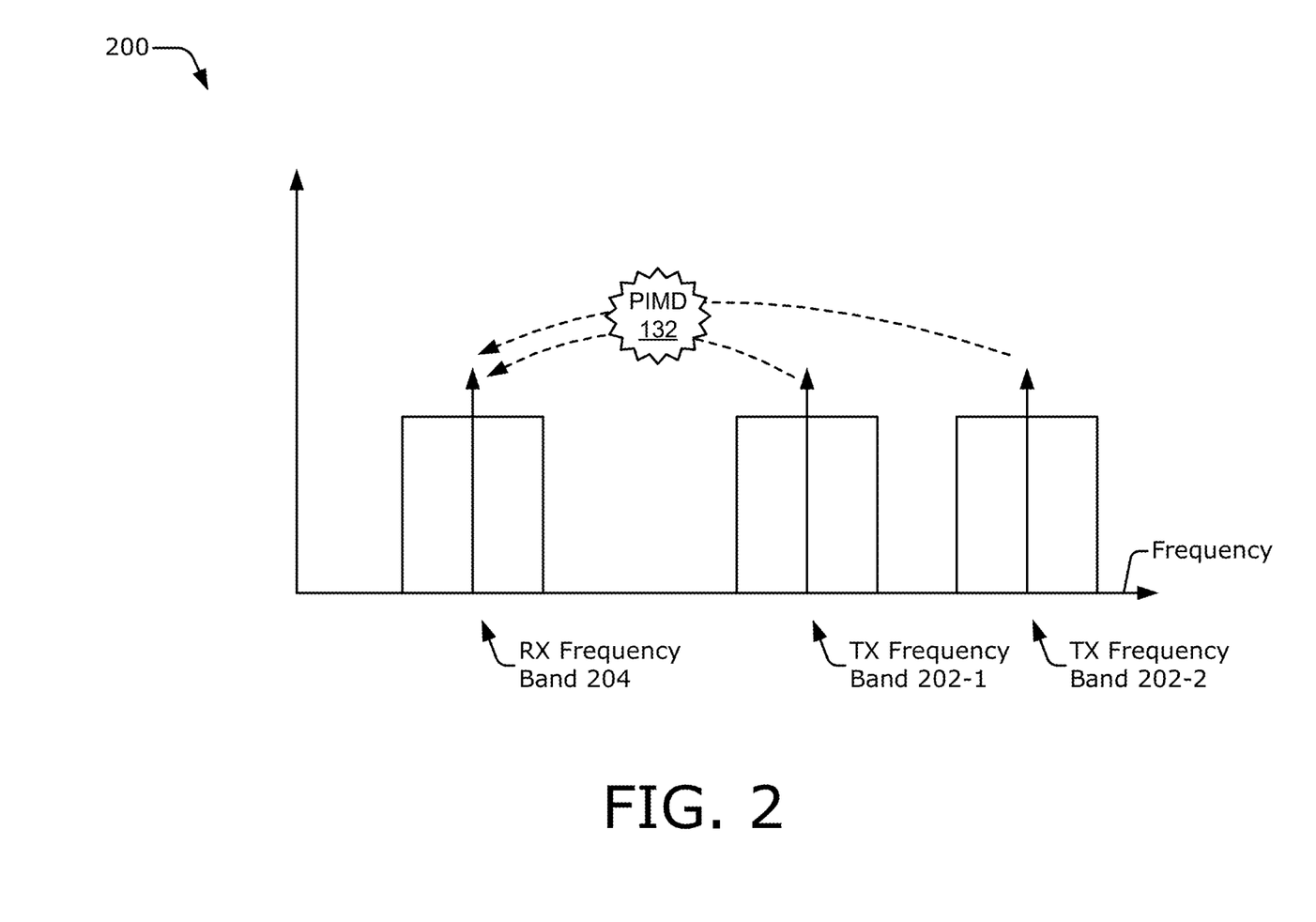
FIG. 2 illustrates example frequencies that can be associated with passive intermodulation distortion.

FIG. 2 illustrates example frequencies that can be associated with passive intermodulation distortion 132. A frequency graph 200 depicts frequencies associated with a first transmit (TX) frequency band 202-1 and a second transmit frequency band 202-2. In this case, the transmit frequency bands 202-1 and 202-2 have different center frequencies. The transmit frequency bands 202-1 and 202-2 can have a same bandwidth or different bandwidths. The frequencies of the transmit frequency bands 202-1 and 202-2 are unique such that the transmit frequency bands 202-1 and 202-2 do not overlap in the frequency domain. In this way, the wireless transceiver 116 can concurrently transmit signals using the transmit frequency bands 202-1 and 202-2.

The frequency graph 200 also depicts a receive (RX) frequency band 204. The receive frequency band 204 is distinct from the transmit frequency bands 202-1 and 202-2. In other words, the receive frequency band 204 has a center frequency that is different than the center frequencies of the transmit frequency bands 202-1 and 202-2. Also, a bandwidth of the receive frequency band 204 is sufficiently narrow to prevent the receive frequency band 204 from overlapping with the transmit frequency band 202-1 or the transmit frequency band 202-2.

During operation, the transmit signals associated with the transmit frequency bands 202-1 and 202-2 can combine in such a way as to generate the passive intermodulation distortion 132. The passive intermodulation distortion 132 can include at least one frequency associated with an intermodulation product of the transmit frequency bands 202-1 and 202-2. Additionally or alternatively, the passive intermodulation distortion 132 can include at least one frequency associated with a harmonic of the transmit frequency band 202-1 or 202-2.

Sometimes, the frequency of the passive intermodulation distortion 132 is within the receive frequency band 204. Consequently, the passive intermodulation distortion 132 can desensitize the wireless transceiver 116 as the wireless transceiver 116 concurrently transmits within the transmit frequency bands 202-1 and 202-2 and receives within the receive frequency band 204. In this situation, the transmit frequency bands 202-1 and 202-2 can be considered aggressor bands that generate the passive intermodulation distortion 132, and the receive frequency band 204 can be considered a victim frequency band that is impacted by the passive intermodulation distortion 132.

Techniques for frequency-division duplexing can utilize a variety of communication bands (e.g., Long Term Evolution (LTE) and 5G NR bands). Each communication band for frequency-division duplexing is associated with a set of frequencies for uplink and a set of frequencies for downlink. The set of frequencies for uplink are referred to as an uplink frequency band. The set of frequencies for downlink are referred to as a downlink frequency band.

The communication bands are uniquely numbered and include for instance LTE bands 1-28 and band 66 for frequency-division duplexing. For clarity, this numbering is used to describe the corresponding uplink and downlink frequency bands. For example, uplink frequency band 1 refers to the uplink frequencies associated with communication band 1. As another example, downlink frequency band 2 refers to the downlink frequencies associated with communication band 2.

In a first example, the transmit frequency band 202-1 represents downlink frequency band 2 (e.g., frequencies between approximately 1930 and 1990 megahertz (MHz)). The transmit frequency band 202-2 represents downlink frequency band 4 (e.g., frequencies between approximately 2110 and 2155 MHz). The receive frequency band 204 represents uplink frequency band 4 (e.g., frequencies between approximately 1710 and 1755 MHz). In this example, the passive intermodulation distortion 132 can occur from an intermodulation product associated with a difference between twice the transmit frequency band 202-1 and the transmit frequency band 202-2. In this case, the passive intermodulation distortion 132 occurs within the receive frequency band 204.

The intermodulation product described in the first example can also produce passive intermodulation distortion 132 for other frequency bands. For example, the transmit frequency band 202-1 can be downlink frequency band 11, the transmit frequency band 202-2 can be downlink frequency band 21, and the receive frequency band 204 can be uplink frequency band 21. As another example, the transmit frequency band 202-1 can be downlink frequency band 14, the transmit frequency band 202-2 can be downlink frequency band 13, and the receive frequency band 204 can be uplink frequency band 13.

In a second example, the transmit frequency band 202-1 represents downlink frequency band 12 (e.g., frequencies between approximately 729 and 726 MHz). The transmit frequency band 202-2 represents downlink frequency band 13 (e.g., frequencies between approximately 746 and 756 MHz). The receive frequency band 204 represents uplink frequency band 12 (e.g., frequencies between approximately 699 and 716 MHz). In this example, the passive intermodulation distortion 132 can occur from an intermodulation product associated with a difference between three times the transmit frequency band 202-1 and twice the transmit frequency band 202-2. In this case, the passive intermodulation distortion 132 occurs within the receive frequency band 204.

The intermodulation product described in the second example can also produce passive intermodulation distortion 132 for other frequency bands. For example, the transmit frequency band 202-1 can be downlink frequency band 18, the transmit frequency band 202-2 can be downlink frequency band 5, and the receive frequency band 204 can be uplink frequency band 5.

In a third example, the transmit frequency band 202-1 represents downlink frequency band 19 (e.g., frequencies between approximately 875 and 890 MHz), and the receive frequency band 204 represents uplink frequency band 3 (e.g., frequencies between approximately 1710 and 1785 MHz). In this example, the passive intermodulation distortion 132 can occur from a harmonic associated with twice the transmit frequency band 202-1. In this case, the passive intermodulation distortion 132 occurs within the receive frequency band 204.

The harmonic described in the third example can also produce passive intermodulation distortion 132 for other frequency bands. For example, the transmit frequency band 202-1 can be downlink frequency band 5, and the receive frequency band 204 can be uplink frequency band 66.

In a fourth example, three transmit frequency bands 202 produce the passive intermodulation distortion 132. Consider a case in which the transmit frequency band 202-1 represents downlink frequency band 26 (e.g., frequencies between approximately 859 and 894 MHz), the transmit frequency band 202-2 represents downlink frequency band 71 (e.g., frequencies between approximately 617 and 652 MHz), and a third transmit frequency band (not shown) represents downlink frequency band 29 (e.g., frequencies between approximately 717 and 728 MHz). The receive frequency band 204 represents uplink frequency band 26 (e.g., frequencies between 814 and 849 MHz). In this example, the passive intermodulation distortion 132 can occur from a summation of the transmit frequency bands 202-1 and 202-2 subtracted by the third transmit frequency band. In this case, the passive intermodulation distortion 132 occurs within the receive frequency band 204.

In general, the passive intermodulation distortion 132 can occur from a variety of different frequency bands, intermodulation products, and harmonics. Sometimes the receive frequency band 204 and one of the transmit frequency bands 202 represent uplink frequencies and downlink frequencies associated with a same communication band. For example, the transmit frequency band 202-2 and the receive frequency band 204 in the first example are associated with communication band 4. Likewise, the transmit frequency band 202-1 and the receive frequency band 204 in the third example are associated with communication band 12.

In the above examples, the transmit frequency bands 202-1 and 202-2 and the receive frequency band 204 are described with respect to the base station 104. Other transmit frequency bands 202-1 and 202-2 can also produce passive intermodulation distortion 132 within other receive frequency bands 204 for the computing device 102. From the computing device 102's perspective, the transmit frequency bands 202-1 and 202-2 are associated with uplink frequency bands, and the receive frequency band 204 is associated with a downlink frequency band.

The passive intermodulation distortion 132 can also occur through the use of both frequency-division duplexing and time-division duplexing communication bands. For example, a time-division-duplexing transmit frequency band and a frequency-division duplexing transmit frequency band can generate passive intermodulation distortion 132 within a frequency-division duplexing receive band. As another example, two frequency-division duplexing transmit frequency bands can generate passive intermodulation distortion 132 within a time-division duplexing receive band.

Figure 31:
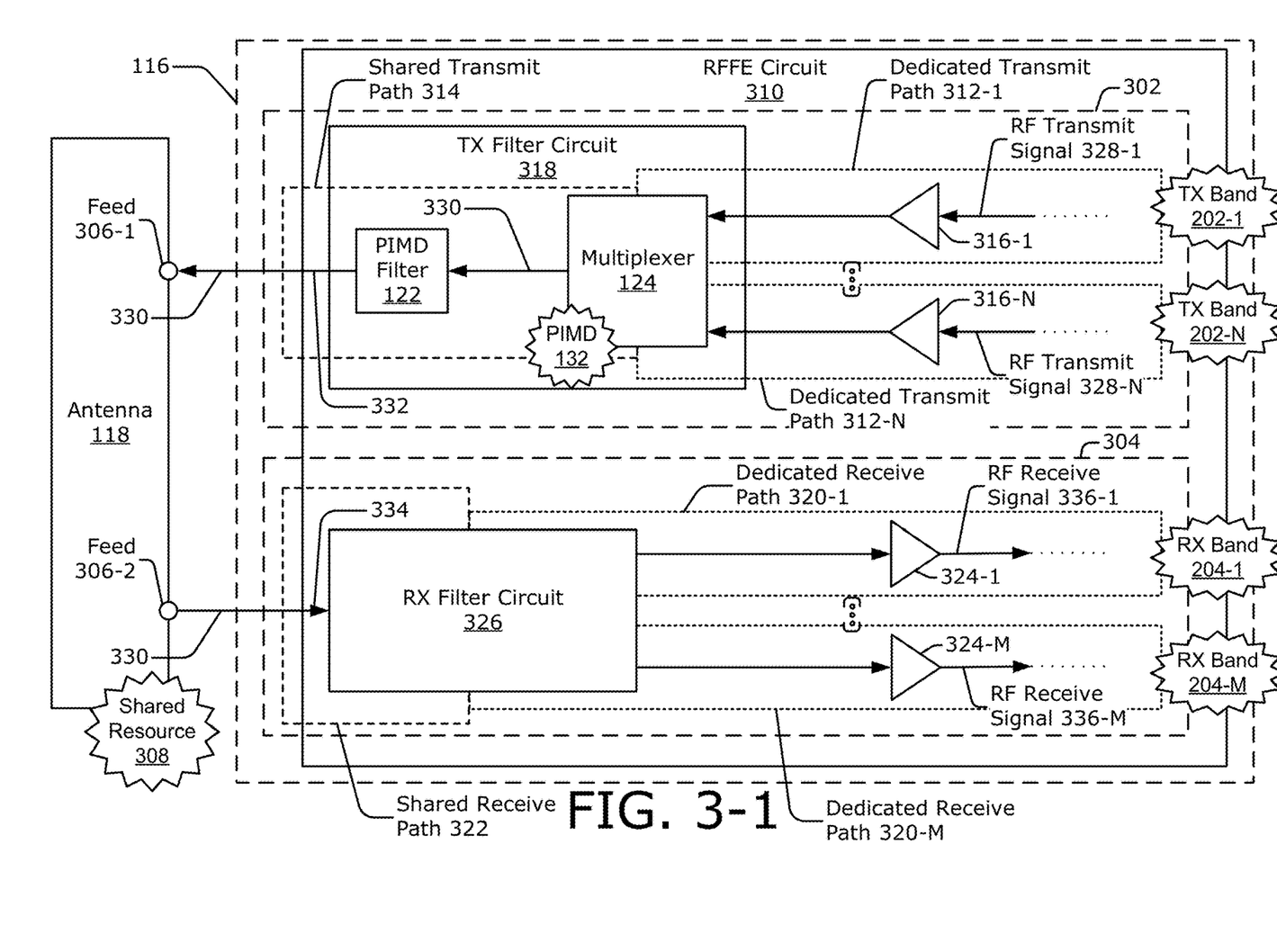

Without the ability to attenuate the passive intermodulation distortion 132, other wireless transceivers can become desensitized. This desensitization makes it challenging to receive signals within the receive frequency band 204. The passive-intermodulation-distortion filter 122, however, can filter the passive intermodulation distortion 132 to improve the performance of the wireless transceiver 116 in comparison to other wireless transceivers that do not include the passive-intermodulation-distortion filter 122. Operations of the wireless transceiver 116 are further described with respect to FIG. 3-1.

FIG. 3-1 illustrates an example antenna 118 and an example wireless transceiver 116. In the depicted configuration, the wireless transceiver 116 includes a transmitter 302 and a receiver 304. The transmitter 302 is coupled to a first feed 306-1 of the antenna 118. The receiver 304 is coupled to a second feed 306-2 of the antenna 118. The first feed 306-1 can be referred to as a transmit feed, and the second feed 306-2 can be referred to as a receive feed. The antenna 118 is a resource that is shared by both the transmitter 302 and the receiver 304. In this manner, the antenna 118 represents a shared resource 308.

Together, the wireless transceiver 116 and the antenna 118 can concurrently transmit and receive radio-frequency signals associated with different frequency bands (e.g., transmit and receive radio-frequency signals during a same time interval). Also, the wireless transceiver 116 and the antenna 118 can concurrently transmit and receive radio-frequency signals associated with different frequency bands. These different frequency bands can include transmit frequency bands 202-1 to 202-N (TX bands 202-1 to 202-N) and receive frequency bands 204-1 to 204-M (RX bands 204-1 to 204-M), where N and M represent positive integers that may or may not be the same.

The wireless transceiver 116 includes a radio-frequency front-end circuit 310, which can implement at least a portion of the transmitter 302 and at least a portion of the receiver 304. In some implementations, the wireless transceiver 116 is implemented using multiple circuits, including the radio-frequency front-end circuit 310 and a transceiver circuit (not shown). As such, the components that form the transmitter 302 and the receiver 304 can be distributed across multiple circuits. Also, some components of the wireless transceiver 116 can be implemented by the processor 108, a digital signal processor, or a modem.

To utilize the multiple transmit frequency bands 202-1 to 202-N for transmission, the transmitter 302 includes dedicated transmit paths 312-1 to 31-N and a shared transmit path 314. Each dedicated transmit path 312-1 to 312-N is associated with a corresponding transmit frequency band 202-1 to 202-N. In other words, a dedicated transmit path 312-1 to 312-N propagates a signal associated with its corresponding transmit frequency band 202-1 to 202-N. The dedicated transmit paths 312-1 to 312-N include separate components, such as respective amplifiers 316-1 to 316-N (e.g., power amplifiers), respective phase shifters (not shown), and/or respective mixers (not shown).

The shared transmit path 314 is associated with at least a subset of the transmit frequency bands 202-1 to 202-N. In other words, the shared transmit path 314 propagates two or more signals respectively associated with two or more of the transmit frequency bands 202-1 to 202-N. In general, the shared transmit path 314 couples the dedicated transmit paths 312-1 to 312-N to the transmit feed 306-1 of the antenna 118.

Within the radio-frequency front-end circuit 310 (RFFE circuit 310), the transmitter 302 includes a transmit filter circuit 318. The transmit filter circuit 318 provides an interface between the dedicated transmit paths 312-1 to 312-N and the shared transmit path 314 and filters passive intermodulation distortion 132. The transmit filter circuit 318 includes the passive circuit 120, which is represented by the multiplexer 124 in FIGS. 3-1, and the passive-intermodulation-distortion filter 122. The multiplexer 124 represents a multi-input single-output circuit with multiple filters. Each filter within the multiplexer 124 is cascaded with the passive-intermodulation-distortion filter 122. By implementing the passive-intermodulation-distortion filter 122 between the multiplexer 124 and the feed 306-1 of the antenna 118, the passive-intermodulation-distortion filter 122 can attenuate the passive intermodulation distortion generated by the multiplexer 124.

To utilize the multiple receive frequency bands 204-1 to 204-M for reception, the receiver 304 includes dedicated receive paths 320-1 to 320-M and a shared receive path 322. Each dedicated receive path 320-1 to 320-M is associated with a corresponding receive frequency band 204-1 to 204-M. In other words, a dedicated receive path 320-1 to 320-M propagates a signal associated with its corresponding receive frequency band 204-1 to 204-M. The dedicated receive paths 320-1 to 320-M include separate components, such as respective amplifiers 324-1 to 324-N (e.g., low-noise amplifiers), respective phase shifters (not shown), and/or respective mixers (not shown).

The shared receive path 322 is associated with at least a subset of the receive frequency bands 204-1 to 204-M. In other words, the shared receive path 322 propagates two or more signals respectively associated with two or more of the receive frequency bands 204-1 to 204-M. In general, the shared receive path 322 couples the receive frequency bands 204-1 to 204-M to the receive feed 306-2 of the antenna 118.

Within the radio-frequency front-end circuit 310, the receiver 304 includes a receive filter circuit 326 (RX filter circuit 326). The receive filter circuit 326 provides an interface between the dedicated receive paths 320-1 to 320-M and the shared receive path 322. The receive filter circuit 326 can include one or more filters, which can be implemented as cavity filters, acoustic filters (e.g., SAW filters or BAW filters), waveguide filters, or notch filters. The filters can form a multiplexer, as further described with respect to FIGS. 4 and 5. In general, the receive filter circuit 326 is a single-input multi-output circuit with multiple filters.

During transmission, the dedicated transmit paths 312-1 to 312-N generate radio-frequency transmit signals 328-1 to 328-N(RF transmit signals 328-1 to 328-N), which are respectively associated with the transmit frequency bands 202-1 to 202-N. As an example, the dedicated transmit paths 312-1 to 312-N can upconvert baseband transmit signals or intermediate-frequency transmit signals using mixers (not shown) to generate the radio-frequency transmit signals 328-1 to 328-N. The dedicated transmit paths 312-1 to 312-N can also modify or condition the radio-frequency transmit signals 328-1 to 328-N. For example, the dedicated transmit paths 312-1 to 312-N can apply phase shifts to the radio-frequency transmit signals 328-1 to 328-N and/or amplify the radio-frequency transmit signals 328-1 to 328-N using the amplifiers 316-1 to 316-N.

The multiplexer 124 accepts the radio-frequency transmit signals 328-1 to 328-N from the dedicated transmit paths 312-1 to 312-N. The multiplexer 124 filters the radio-frequency transmit signals 328-1 to 328-N individually and combines the filtered radio-frequency transmit signals 328-1 to 328-N together to generate a composite transmit signal 330. Due to imperfections within the multiplexer 124, the composite transmit signal 330 includes passive intermodulation distortion 132.

The passive-intermodulation-distortion filter 122 attenuates the passive intermodulation distortion 132 within the composite transmit signal 330 to generate a filtered composite transmit signal 332. The antenna 118 accepts the filtered composite transmit signal 332 at the feed 306-1 and transmits the filtered composite transmit signal 332.

During reception, which can occur concurrently with transmission, the antenna receives a composite receive signal 334, which includes multiple radio-frequency receive signals 336-1 to 336-M respectively associated with the receive bands 204-1 to 204-M. The antenna 118 passes the composite receive signal 334 to the receive filter circuit 326 using the feed 306-2.

The receive filter circuit 326 filters the composite receive signal 334 to split and pass the radio-frequency receive signals 336-1 to 336-M to the respective dedicated receive paths 320-1 to 320-M. The dedicated receive paths 320-1 to 320-M can further process or condition the radio-frequency receive signals 336-1 to 336-M. For example, the dedicated receive paths 320-1 to 320-M can amplify the radio-frequency receive signals 336-1 to 336-M using the amplifiers 324-1 to 324-M. Additionally, the dedicated receive paths 320-1 to 320-M can apply phase shifts to the radio-frequency receive signals 336-1 to 336-M and downconvert the radio-frequency receive signals 336-1 to 336-M to lower frequency bands. The receiver 304 can pass downconverted versions of the radio-frequency receive signals 336-1 to 336-M to the processor 108 for further processing.

Figure 32:
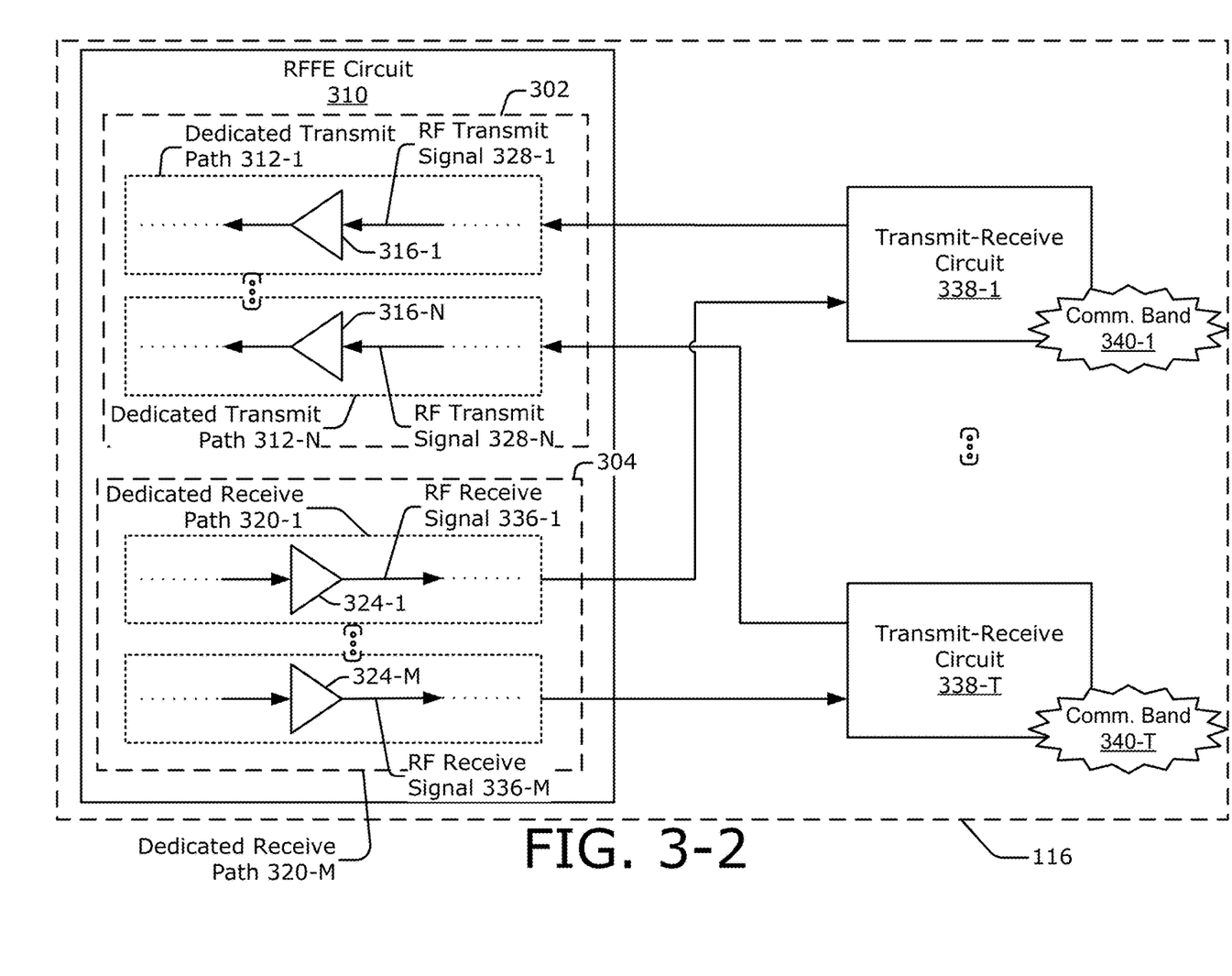

Due to the passive-intermodulation-distortion filter 122 filtering the passive intermodulation distortion 132 generated by the multiplexer 124, performance of the receiver 304 is not significantly impacted by the passive intermodulation distortion 132. The radio-frequency integrated circuit 310 can be coupled to other components of the wireless transceiver 116, as further described with respect to FIG. 3-2.

FIG. 3-2 illustrates example transmit-receive circuits 338-1 to 338-T of the wireless transceiver 116 for passive intermodulation distortion filtering. The variable T represents a positive integer that is equal to the larger one of N or M. The transmit-receive circuit 338-1 represents a set of transmit and receive chains, which condition signals associated with communication band 340-1. The communication band 340-1 is associated with the transmit frequency band 202-1 and the receive frequency band 204-1. The transmit-receive circuit 338-T includes another set of transmit and receive chains, which condition signals associated with communication band 340-T. The communication band 340-T is associated with the transmit frequency band 202-N and the receive frequency band 204-M. As an example, the communication band 340-T can be associated with higher frequencies than the communication band 340-1.

In some implementations, the transmit-receive circuits 338-1 to 338-T are implemented as part of the radio-frequency front-end circuit 310. In this case, the transmit-receive circuits 338-1 to 338-T can respectively condition the radio-frequency transmit signals 328-1 to 328-N and the radio-frequency receive signals 336-1 to 336-M. In other implementations, the transmit-receive circuits 338-1 to 338-T are implemented as part of another integrated circuit, such as an intermediate-frequency circuit or a baseband-frequency circuit. In this aspect, the transmit-receive circuits 338-1 to 338-T can condition intermediate-frequency or baseband versions of the radio-frequency transmit signals 328-1 to 328-N and the radio-frequency receive signals 336-1 to 336-M, respectively.

As shown in FIG. 3-2, the transmit-receive circuit 338-1 is coupled to the dedicated transmit path 312-1 and the dedicated receive path 320-1. In particular, the transmit-receive circuit 338-1 is coupled to the amplifiers 316-1 and 324-1. The transmit-receive circuit 338-T is coupled to the dedicated transmit path 312-N and the dedicated receive path 320-M. In particular, the transmit-receive circuit 338-T is coupled to the amplifiers 316-N and 324-M.

Considering FIGS. 3-1 and 3-2 together, the transmit-receive circuits 338-1 to 338-T are coupled to the same transmit filter circuit 318. As such, signals generated by the transmit-receive circuits 338-1 to 338-T pass though the multiplexer 124 and the passive-intermodulation-distortion filter 122 during transmission. The transmit-receive circuits 338-1 to 338-T are also coupled to the same receive filter circuit 326. As such, the transmit-receive circuits 338-1 to 338-T accept signals that passed through the receive filter circuit 326 during reception. Example types of transmit filter circuits 318 and receive filter circuits 326 are further described with respect to FIGS. 4 and 5.

Figure 4:
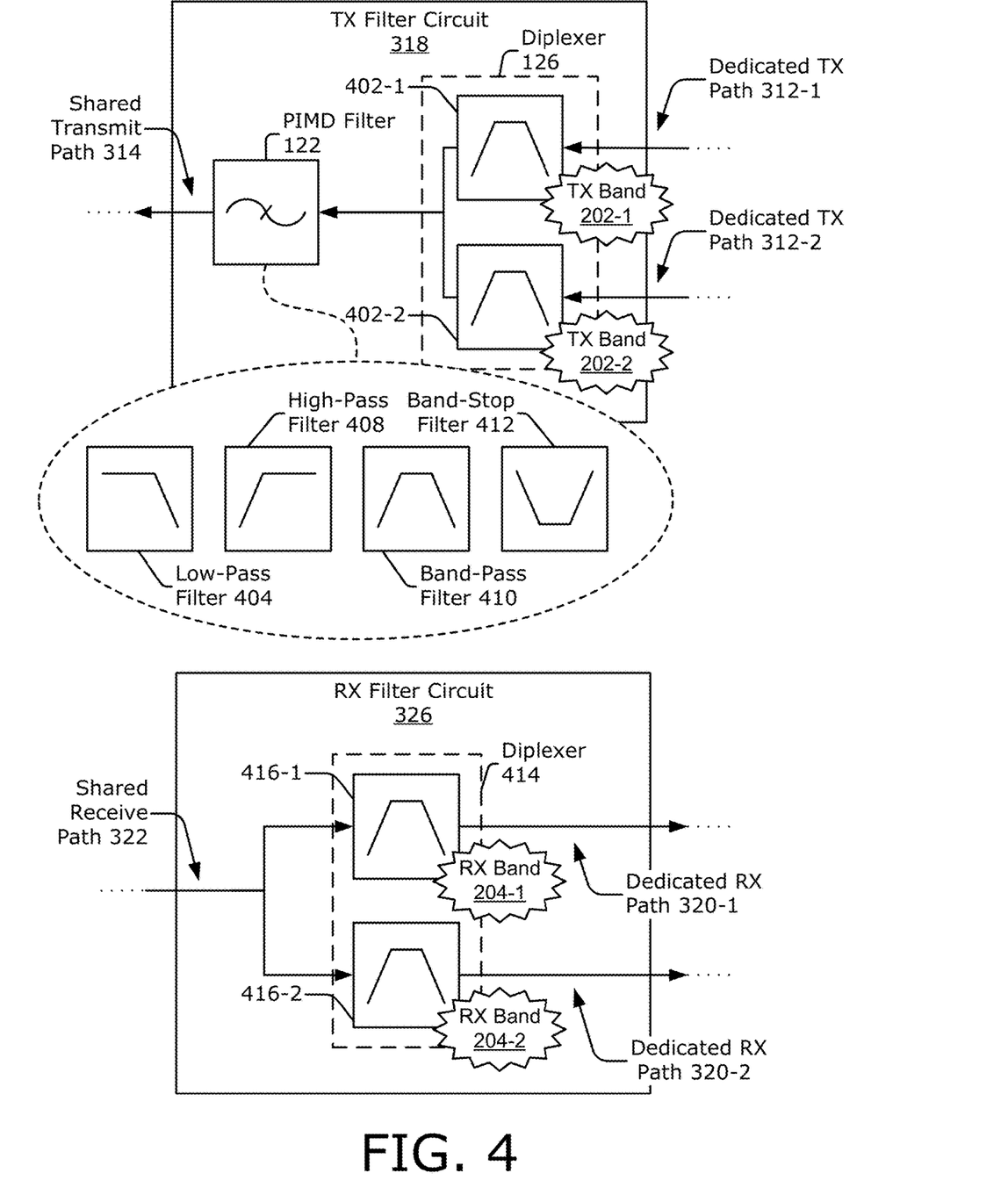
FIG. 4 illustrates an example transmit filter circuit and an example receive filter circuit for passive intermodulation distortion filtering.

FIG. 4 illustrates an example transmit filter circuit 318 and an example receive filter circuit 326 for passive intermodulation distortion filtering. In this example, the multiplexer 124 of the transmit filter circuit 318 is implemented as the diplexer 126. The diplexer 126 includes two band-pass filters 402-1 and 402-2. Inputs of the band-pass filters 402-1 and 402-2 are respectively coupled to other components within the dedicated transmit paths 312-1 and 312-2, such as corresponding amplifiers 316. Outputs of the band-pass filters 402-1 and 402-2 are coupled together.

The band-pass filter 402-1 has a frequency response that passes the transmit frequency band 202-1 (TX band 202-1). The band-pass filter 402-1 can also attenuate the transmit frequency band 202-2 (TX band 202-2). The band-pass filter 402-2 has a frequency response that passes the transmit frequency band 202-2. The band-pass filter 402-2 can also attenuate the transmit frequency band 202-1.

The passive-intermodulation-distortion filter 122 is coupled between the output of the diplexer 126 (e.g., the outputs of the band-pass filters 402-1 and 402-2) and the feed 306-1 of the antenna 118. The passive-intermodulation-distortion filter 122 can be implemented using a variety of different types of filters, including a low-pass filter 404, a high-pass filter 406, a band-pass filter 410, a band-stop filter 412, or some combination thereof. In an example aspect, the passive-intermodulation-distortion filter 122 is implemented using a cavity filter. In general, the passive-intermodulation-distortion filter 122 has a frequency response that represents a combination of the different frequency responses of the band-pass filters 402-1 and 402-2. In other words, the frequency response of the passive-intermodulation-distortion filter 122 has a passband that includes the passbands of the band-pass filters 402-1 and 402-2.

The receive filter circuit 326 includes a diplexer 414, which is coupled between the antenna 118 and the dedicated receive paths 320-1 and 320-2. Similar to the diplexer 126 of the transmit filter circuit 318, the diplexer 414 includes two band-pass filters 416-1 and 416-2. Inputs of the band-pass filters 416-1 and 416-2 are coupled to the feed 306-2 of the antenna 118. Outputs of the band-pass filters 416-1 and 416-2 are respectively coupled to the components of the dedicated receive paths 320-1 and 320-2, such as corresponding amplifier 324.

The band-pass filter 416-1 has a frequency response that passes the receive frequency band 204-1 (RX band 204-1) and attenuates the receive frequency band 204-2 (RX band 204-2). The band-pass filter 416-2 has a frequency response that passes the receive frequency band 204-2 and attenuates the receive frequency band 204-1.

To protect the receiver 304 from desensitization caused by the passive intermodulation distortion 132, the passive-intermodulation-distortion filter 122 has a frequency response that passes the transmit frequency bands 202-1 to 202-2 and rejects (e.g., attenuates) one or more of the receive frequency bands 204-1 to 204-2 that are associated with the passive intermodulation distortion 132. If the transmit frequency bands 202-1 to 202-2 are lower than the receive frequency bands 204-1 to 204-2, the passive-intermodulation-distortion filter 122 can be implemented as the low-pass filter 404. If the transmit frequency bands 202-1 to 202-2 are higher than the receive frequency bands 204-1 to 204-2, the passive-intermodulation-distortion filter 122 can be implemented as the high-pass filter 408. If the transmit frequency bands 202-1 to 202-2 are between the receive frequency bands 204-1 and 204-2, the passive-intermodulation-distortion filter 122 can be implemented as the band-pass filter 410. If the transmit frequency band 202-1 is lower than the receive frequency bands 204-1 and 204-2 and the transmit frequency band 202-2 is higher than the receive frequency bands 204-1 and 204-2, the passive-intermodulation-distortion filter 122 can be implemented as the band-stop filter 412.

Figure 5:
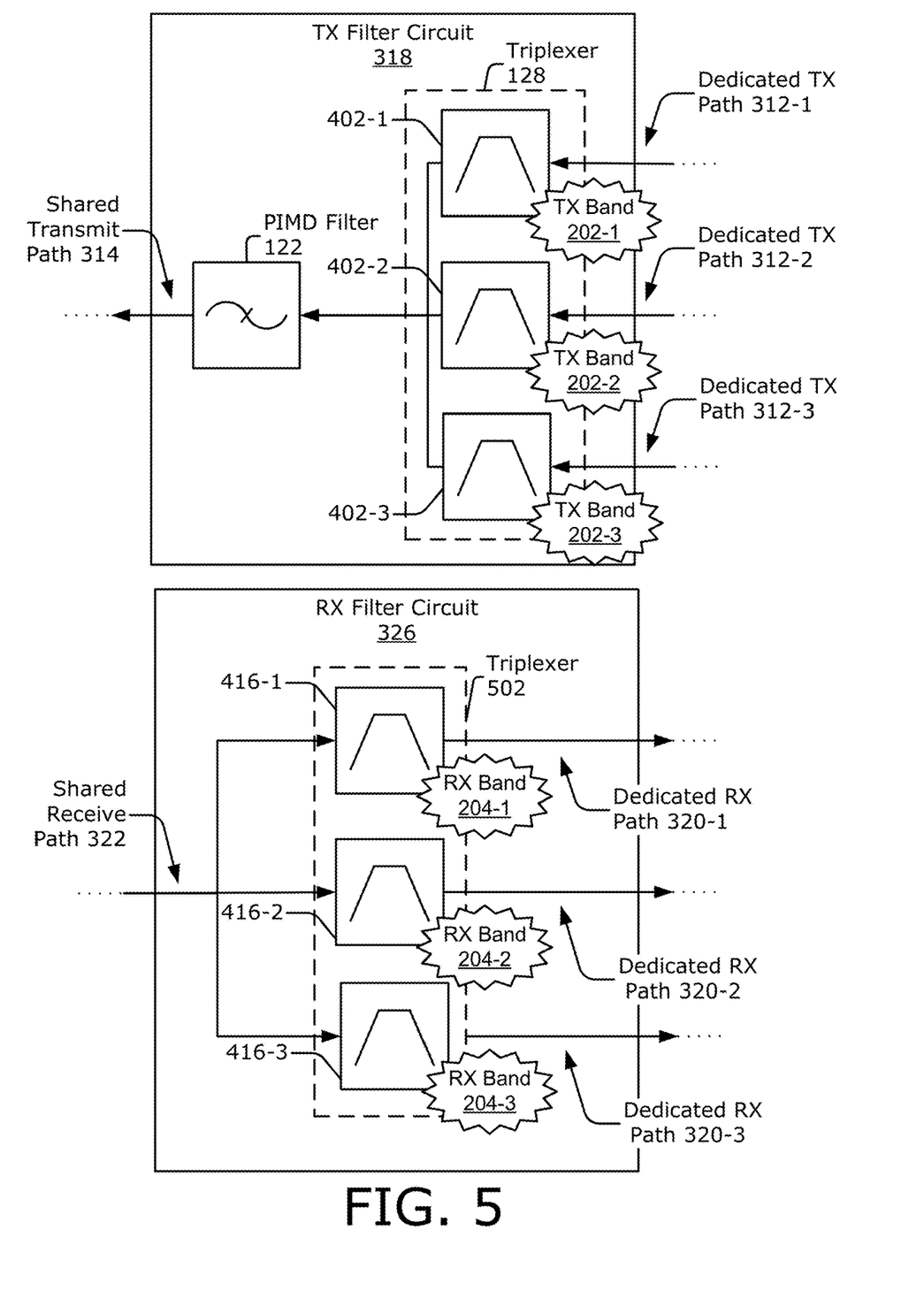
FIG. 5 illustrates another example transmit filter circuit and another example receive filter circuit for passive intermodulation distortion filtering.

FIG. 5 illustrates another example transmit filter circuit 318 and another example receive filter circuit 326 for passive intermodulation distortion filtering. In this example, the multiplexer 124 of the transmit filter circuit 318 is implemented as the triplexer 128. The triplexer 128 includes three band-pass filters 402-1 to 402-3. Inputs of the band-pass filters 402-1 to 402-3 are respectively coupled to other components within the dedicated transmit paths 312-1 to 312-3. Outputs of the band-pass filters 402-1 to 402-3 are coupled together.

The band-pass filters 402-1 to 402-3 have frequency responses that respectively pass the transmit frequency bands 202-1 to 202-3. Each of the band-pass filters 402-1 to 402-3 can also attenuate frequencies associated with one or more of the other transmit frequency bands 202-1 to 202-3.

The receive filter circuit 326 includes a triplexer 502, which is coupled between the antenna 118 and the dedicated receive paths 320-1 to 320-3. Similar to the triplexer 128 of the transmit filter circuit 318, the triplexer 502 includes three band-pass filters 416-1 to 416-3. Inputs of the band-pass filters 416-1 to 416-3 are coupled to the feed 306-2 of the antenna 118. Outputs of the band-pass filters 416-1 to 416-3 are respectively coupled to components of the dedicated receive paths 320-1 to 320-3.

The band-pass filters 416-1 to 416-3 have frequency responses that respectively pass the receive frequency bands 204-1 to 204-3. Each of the band-pass filters 416-1 to 416-3 also attenuate frequencies associated with the other receive frequency bands 204-1 to 204-3.

The passive-intermodulation-distortion filter 122 has a frequency response that passes the transmit frequency bands 202-1 to 202-3 and rejects one or more of the receive frequency bands 204-1 to 204-3. In general, the frequency response of the passive-intermodulation-distortion filter 122 can be designed to support any quantity of transmit frequency bands 202-1 to 202-N and receive frequency bands 204-1 to 204-M. Although examples of the transmit filter circuit 318 and the receive filter circuit 326 utilizing diplexers and triplexers are shown in FIGS. 4 and 5, other implementations of these circuits can include any type of multiplexer, including quadplexers.

Figure 6:
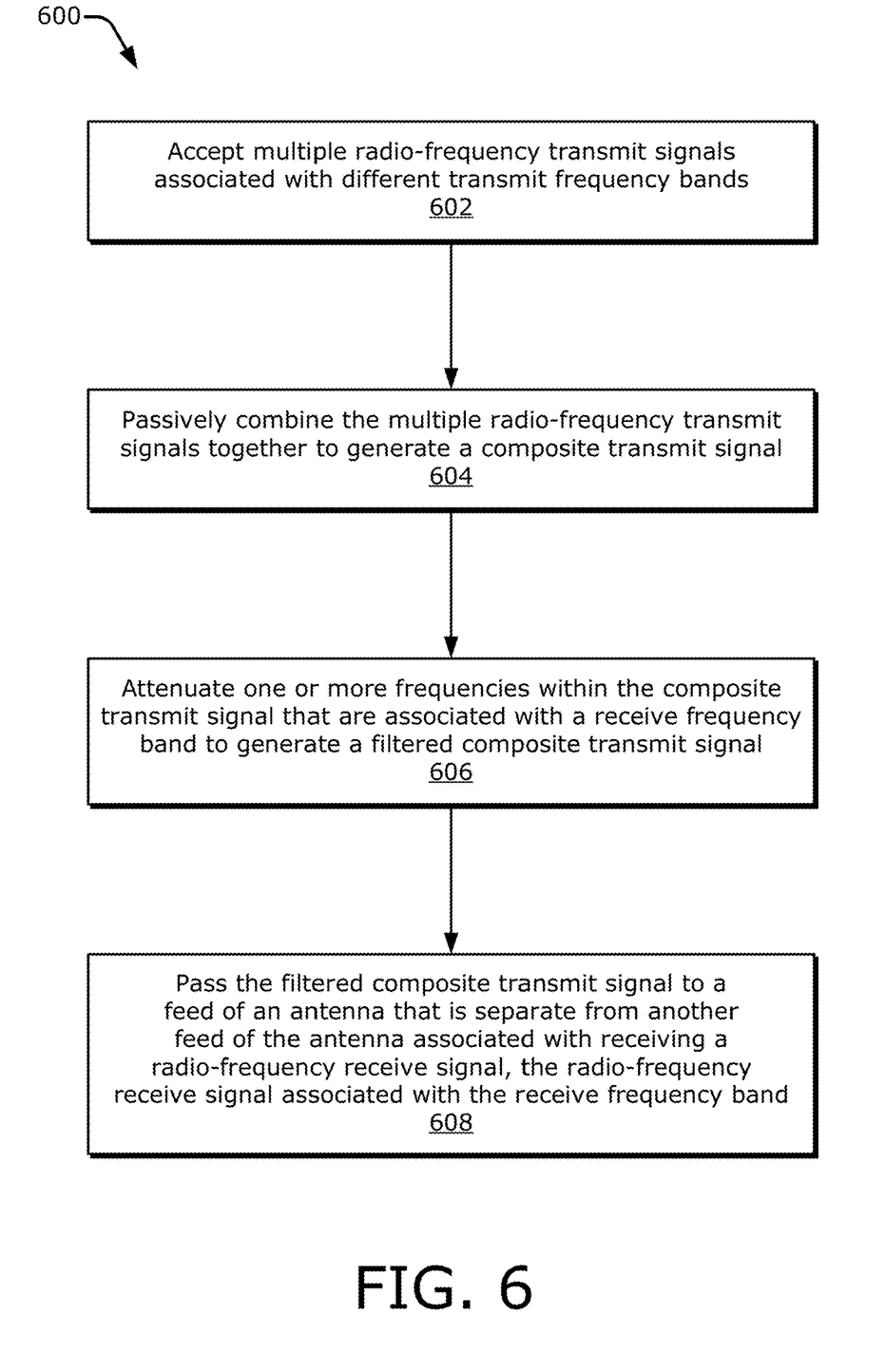
FIG. 6 is a flow diagram illustrating an example process for passive intermodulation distortion filtering.

FIG. 6 is a flow diagram illustrating an example process 600 for passive intermodulation distortion filtering. The process 600 is described in the form of a set of blocks 602-608 that specify operations that can be performed. However, operations are not necessarily limited to the order shown in FIG. 6 or described herein, for the operations may be implemented in alternative orders or in fully or partially overlapping manners. Also, more, fewer, and/or different operations may be implemented to perform the process 600, or an alternative process. Operations represented by the illustrated blocks of the process 600 may be performed by a wireless transceiver 116 of a computing device 102 or a base station 104 (e.g., of FIG. 1). More specifically, the operations of the process 600 may be performed, at least in part, by a radio-frequency front-end circuit 310 (e.g., of FIG. 3-1) or a transmit filter circuit 318 (e.g., of FIGS. 3-5).

At block 602, multiple radio-frequency transmit signals associated with different transmit frequency bands are accepted. For example, the multiplexer 124 accepts multiple radio-frequency transmit signals 328-1 to 328-N. The radio-frequency transmit signals 328-1 to 328-N are associated with different transmit frequency bands 202-1 to 202-N. The different transmit frequency bands 202-1 to 202-N represent multiple transmit frequency bands 202-1 to 202-N that differ from each other. The multiple transmit frequency bands 202-1 to 202-N can be used by the computing device 102 for transmitting uplink signals or used by the base station 104 for transmitting downlink signals.

The multiplexer 124 can be implemented as a diplexer 126 as shown in FIG. 4, a triplexer 128 as shown in FIG. 5, or a quadplexer 130. In general, the multiplexer 124 comprises multiple filters having frequency responses that respectively pass the transmit frequency bands 202-1 to 202-N.

At block 604, the multiple radio-frequency transmit signals are passively combined together to generate a composite transmit signal. For example, the multiplexer 124 combines the multiple radio-frequency transmit signals 328-1 to 328-N together to generate the composite transmit signal 330, as shown in FIG. 3-1. Due to non-linearities and/or imperfections within the multiplexer 124, the composite transmit signal 330 includes passive intermodulation distortion 132. The passive intermodulation distortion 132 has at least one frequency associated with an intermodulation product of the multiple transmit frequency bands 202-1 to 202-N or a harmonic of one of the multiple transmit frequency bands 202-1 to 202-N.

At block 606, one or more frequencies within the composite transmit signal that are associated with a receive frequency band are attenuated to generate a filtered composite transmit signal. For example, the passive-intermodulation-distortion filter 122 attenuates one or more frequencies within the composite transmit signal 330 that are associated with at least one of the receive frequency bands 204-1 to 204-M to generate the filtered composite transmit signal 332, as shown in FIG. 3-1. The passive-intermodulation-distortion filter 122 also passes frequencies associated with the transmit frequency bands 202-1 to 202-N.

At block 608, the filtered composite transmit signal is passed to a feed of an antenna that is separate from another feed of the antenna associated with receiving a radio-frequency receive signal. The radio-frequency receive signal is associated with the receive frequency band. For example, the passive-intermodulation-distortion filter 122 passes the filtered composite transmit signal 332 to the feed 306-1 of the antenna 118. The feed 306-1 is different than the feed 306-2, which is used to accept a composite receive signal 334 with frequencies within one or more of the receive frequency bands 204-1 to 204-M.

Some aspects are described below.

Aspect 1: An apparatus comprising:
  a radio-frequency front-end circuit comprising:
    a transmit filter circuit comprising:
      a passive circuit configured to combine at least two radio-frequency transmit signals associated with different transmit frequency bands; and
      a filter coupled between the passive circuit and a first feed of an antenna, the filter configured to attenuate frequencies associated with a receive frequency band; and
    a receive filter circuit coupled to a second feed of the antenna and configured to pass the frequencies associated with the receive frequency band.

Aspect 2: The apparatus of aspect 1, wherein the passive circuit comprises multiple band-pass filters having different passbands respectively associated with the different transmit frequency bands.

Aspect 3: The apparatus of aspect 2, wherein the multiple band-pass filters form one of the following:
a diplexer;
a triplexer; or
a quadplexer.

Aspect 4: The apparatus of aspect 3, wherein:
the multiple band-pass filters comprise the diplexer;
the diplexer is associated with two transmit frequency bands of the different transmit frequency bands; and
the receive filter circuit comprises another diplexer associated with the receive frequency band and another receive frequency band.

Aspect 5: The apparatus of any of aspects 2 to 4, wherein the multiple band-pass filters comprise multiple cavity filters.

Aspect 6: The apparatus of any previous aspect, wherein a transmit frequency band of the different transmit frequency bands and the receive frequency band represent frequencies associated with a same communication band, the communication band associated with frequency-division-duplexing.

Aspect 7: The apparatus of any previous aspect, wherein:
the radio-frequency front-end circuit comprises:
a first transmit path associated with a first transmit frequency band of the different transmit frequency bands and coupled to a first input of the passive circuit;
a second transmit path associated with a second transmit frequency band of the different transmit frequency bands and coupled to a second input of the passive circuit; and
at least one receive path associated with the receive frequency band, the at least one receive path coupled to an output of the receive filter circuit; and
the filter is configured to have a passband that passes signals associated with the first transmit frequency band and the second transmit frequency band and that attenuates other signals associated with the receive frequency band.

Aspect 8: The apparatus of aspect 7, wherein an intermodulation product of the first transmit frequency band and the second transmit frequency band is within the receive frequency band.

Aspect 9: The apparatus of aspect 7 or 8, wherein:
the first transmit frequency band comprises downlink frequencies associated with communication band 2;
the second transmit frequency band comprises downlink frequencies associated with communication band 4; and
the receive frequency band comprises uplink frequencies associated with the communication band 4.

Aspect 10: The apparatus of aspect 7, wherein a harmonic of at least one of the first transmit frequency band or the second transmit frequency band is within the receive frequency band.

Aspect 11: The apparatus of any one of aspects 7 to 10, wherein:
the first transmit path comprises a first amplifier coupled to the first input of the passive circuit;
the second transmit path comprises a second amplifier coupled to the second input of the passive circuit; and
the at least one receive path comprises a third amplifier coupled to the output of the receive filter circuit.

Aspect 12: The apparatus of any previous aspect, wherein the filter comprises at least one of the following:
a low-pass filter;
a high-pass filter;
a band-pass filter; or
a band-stop filter.

Aspect 13: The apparatus of any previous aspect, wherein the filter comprises at least one cavity filter.

Aspect 14: The apparatus of any previous aspect, wherein the receive filter circuit comprises a multiplexer.

Aspect 15: The apparatus of aspect 14, wherein the multiplexer comprises multiple cavity filters or multiple acoustic filters.

Aspect 16: The apparatus of any previous aspect, wherein the apparatus comprises a base station.

Aspect 17: The apparatus of any previous aspect, wherein the apparatus comprises a computing device.

Aspect 18: An apparatus for filtering, the apparatus comprising:
passive means for generating a composite transmit signal by combining multiple radio-frequency transmit signals associated with different transmit frequency bands;
means for attenuating one or more frequencies within the composite transmit signal that are associated with a receive frequency band to generate a filtered composite transmit signal; and
means for transmitting the filtered composite transmit signal using a feed that is separate from another feed used to receive a radio-frequency receive signal associated with the receive frequency band.

Aspect 19: The apparatus of aspect 18, wherein:
the composite transmit signal includes passive intermodulation distortion associated with an intermodulation product of the different transmit frequency bands; and
the means for attenuating the one or more frequencies within the composite transmit signal is configured to attenuate the passive intermodulation distortion within the receive frequency band.

Aspect 20: The apparatus of aspect 18 or 19, wherein the passive means comprises:
means for passing frequencies associated with a first transmit frequency band of the different transmit frequency bands;
means for passing frequencies associated with a second transmit frequency band of the different transmit frequency bands; and
means for combining the frequencies associated with the first transmit frequency band and the frequencies associated with the second transmit frequency band.

Aspect 21: A method for filtering, the method comprising:
accepting multiple radio-frequency transmit signals associated with different transmit frequency bands;
passively combining the multiple radio-frequency transmit signals together to generate a composite transmit signal;
attenuating one or more frequencies within the composite transmit signal that are associated with a receive frequency band to generate a filtered composite transmit signal; and
passing the filtered composite transmit signal to a feed of an antenna that is separate from another feed of the antenna associated with receiving a radio-frequency receive signal, the radio-frequency receive signal associated with the receive frequency band.

Aspect 22: The method of aspect 21, wherein the attenuating the frequencies comprises attenuating an intermodulation product associated with a combination of the different transmit frequency bands.

Aspect 23: The method of aspect 21 or 22, wherein the attenuating the frequencies comprises at least one of the following:

attenuating frequencies that are higher than frequencies associated with the different transmit frequency bands;

attenuating frequencies that are lower than the frequencies associated with the different transmit frequency bands;

attenuating frequencies that are lower than and higher than the frequencies associated with the different transmit frequency bands; or attenuating frequencies that are between the frequencies associated with the different transmit frequency bands.

Aspect 24: A radio-frequency front-end circuit comprising:

a multiplexer comprising multiple band-pass filters configured to have different frequency responses associated with different transmit frequency bands; and a filter coupled to an output of the multiplexer, the filter configured to:
be coupled to a feed of an antenna that is separate from another feed that is to be used to receive a radio-frequency receive signal; and
have a frequency response that represents a combination of the different frequency responses of the multiple band-pass filters.

Aspect 25: The radio-frequency front-end circuit of aspect 24, wherein the frequency response of the filter attenuates frequencies associated with a receive frequency band of the radio-frequency receive signal.

Aspect 26: The radio-frequency front-end circuit of aspect 24 or 25, wherein the frequency response of the filter passes frequencies associated with the different transmit frequency bands.

Aspect 27: The radio-frequency front-end circuit of any one of aspects 24 to 26, wherein:
the multiplexer is configured to generate a composite transmit signal by combining multiple radio-frequency transmit signals associated with the different transmit frequency bands; and
the filter is configured to attenuate an intermodulation product within the composite transmit signal, the intermodulation product associated with a combination of the different transmit frequency bands and having a frequency within a receive frequency band of the radio-frequency receive signal.

Aspect 28: The radio-frequency front-end circuit of any one of aspects 24 to 27, further comprising:
multiple power amplifiers respectively coupled to the multiple band-pass filters.

Aspect 29: The radio-frequency front-end circuit of any one of aspects 24 to 28, further comprising:
a receive filter circuit configured to:
accept the radio-frequency receive signal from the other feed of the antenna; and
pass frequencies associated with a receive frequency band.

Aspect 30: The radio-frequency front-end circuit of aspect 29, wherein the receive filter circuit comprises a diplexer.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
a radio-frequency front-end circuit comprising:
a transmit filter circuit comprising:
a passive circuit configured to combine at least two radio-frequency transmit signals associated with different transmit frequency bands; and
a filter coupled between the passive circuit and a first feed of an antenna, the filter configured to attenuate frequencies associated with a receive frequency band; and
a receive filter circuit coupled to a second feed of the antenna and configured to pass the frequencies associated with the receive frequency band.

2. The apparatus of claim 1, wherein the passive circuit comprises multiple band-pass filters having different passbands respectively associated with the different transmit frequency bands.

3. The apparatus of claim 2, wherein the multiple band-pass filters form one of the following:
a diplexer;
a triplexer; or
a quadplexer.

4. The apparatus of claim 3, wherein:
the multiple band-pass filters comprise the diplexer;
the diplexer is associated with two transmit frequency bands of the different transmit frequency bands; and
the receive filter circuit comprises another diplexer associated with the receive frequency band and another receive frequency band.

5. The apparatus of claim 2, wherein the multiple band-pass filters comprise multiple cavity filters.

6. The apparatus of claim 1, wherein a transmit frequency band of the different transmit frequency bands and the receive frequency band represent frequencies associated with a same communication band, the communication band associated with frequency-division-duplexing.

7. The apparatus of claim 1, wherein:
the radio-frequency front-end circuit comprises:
a first transmit path associated with a first transmit frequency band of the different transmit frequency bands and coupled to a first input of the passive circuit;
a second transmit path associated with a second transmit frequency band of the different transmit frequency bands and coupled to a second input of the passive circuit; and
at least one receive path associated with the receive frequency band, the at least one receive path coupled to an output of the receive filter circuit; and
the filter is configured to have a passband that passes signals associated with the first transmit frequency band and the second transmit frequency band and that attenuates other signals associated with the receive frequency band.

8. The apparatus of claim 7, wherein an intermodulation product of the first transmit frequency band and the second transmit frequency band is within the receive frequency band.

9. The apparatus of claim 7, wherein:
the first transmit frequency band comprises downlink frequencies associated with communication band 2;
the second transmit frequency band comprises downlink frequencies associated with communication band 4; and
the receive frequency band comprises uplink frequencies associated with the communication band 4.

10. The apparatus of claim 7, wherein a harmonic of at least one of the first transmit frequency band or the second transmit frequency band is within the receive frequency band.

11. The apparatus of claim 7, wherein:
the first transmit path comprises a first amplifier coupled to the first input of the passive circuit;
the second transmit path comprises a second amplifier coupled to the second input of the passive circuit; and
the at least one receive path comprises a third amplifier coupled to the output of the receive filter circuit.

12. The apparatus of claim 1, wherein the filter comprises at least one of the following:
a low-pass filter;
a high-pass filter;
a band-pass filter; or
a band-stop filter.

13. The apparatus of claim 1, wherein the filter comprises at least one cavity filter.

14. The apparatus of claim 1, wherein the receive filter circuit comprises a multiplexer.

15. The apparatus of claim 14, wherein the multiplexer comprises multiple cavity filters or multiple acoustic filters.

16. The apparatus of claim 1, wherein the apparatus comprises a base station.

17. The apparatus of claim 1, wherein the apparatus comprises a computing device.

18. An apparatus for filtering, the apparatus comprising:
passive means for generating a composite transmit signal by combining multiple radio-frequency transmit signals associated with different transmit frequency bands;
means for attenuating one or more frequencies within the composite transmit signal that are associated with a receive frequency band to generate a filtered composite transmit signal; and
means for transmitting the filtered composite transmit signal using a feed that is separate from another feed used to receive a radio-frequency receive signal associated with the receive frequency band.

19. The apparatus of claim 18, wherein:
the composite transmit signal includes passive intermodulation distortion associated with an intermodulation product of the different transmit frequency bands; and
the means for attenuating the one or more frequencies within the composite transmit signal is configured to attenuate the passive intermodulation distortion within the receive frequency band.

20. The apparatus of claim 18, wherein the passive means comprises:
means for passing frequencies associated with a first transmit frequency band of the different transmit frequency bands;

means for passing frequencies associated with a second transmit frequency band of the different transmit frequency bands; and
means for combining the frequencies associated with the first transmit frequency band and the frequencies associated with the second transmit frequency band.

21. A method for filtering, the method comprising:
accepting multiple radio-frequency transmit signals associated with different transmit frequency bands;
passively combining the multiple radio-frequency transmit signals together to generate a composite transmit signal;
attenuating one or more frequencies within the composite transmit signal that are associated with a receive frequency band to generate a filtered composite transmit signal; and
passing the filtered composite transmit signal to a feed of an antenna that is separate from another feed of the antenna associated with receiving a radio-frequency receive signal, the radio-frequency receive signal associated with the receive frequency band.

22. The method of claim 21, wherein the attenuating the frequencies comprises attenuating an intermodulation product associated with a combination of the different transmit frequency bands.

23. The method of claim 21, wherein the attenuating the frequencies comprises at least one of the following:
attenuating frequencies that are higher than frequencies associated with the different transmit frequency bands;
attenuating frequencies that are lower than the frequencies associated with the different transmit frequency bands;
attenuating frequencies that are lower than and higher than the frequencies associated with the different transmit frequency bands; or
attenuating frequencies that are between the frequencies associated with the different transmit frequency bands.

24. A radio-frequency front-end circuit comprising:
a multiplexer comprising multiple band-pass filters configured to have different frequency responses associated with different transmit frequency bands; and
a filter coupled to an output of the multiplexer, the filter configured to:
be coupled to a feed of an antenna that is separate from another feed that is to be used to receive a radio-frequency receive signal; and
have a frequency response that represents a combination of the different frequency responses of the multiple band-pass filters.

25. The radio-frequency front-end circuit of claim 24, wherein the frequency response of the filter attenuates frequencies associated with a receive frequency band of the radio-frequency receive signal.

26. The radio-frequency front-end circuit of claim 24, wherein the frequency response of the filter passes frequencies associated with the different transmit frequency bands.

27. The radio-frequency front-end circuit of claim 24, wherein:
the multiplexer is configured to generate a composite transmit signal by combining multiple radio-frequency transmit signals associated with the different transmit frequency bands; and
the filter is configured to attenuate an intermodulation product within the composite transmit signal, the intermodulation product associated with a combination of the different transmit frequency bands and having a frequency within a receive frequency band of the radio-frequency receive signal.

28. The radio-frequency front-end circuit of claim 24, further comprising:
multiple power amplifiers respectively coupled to the multiple band-pass filters.

29. The radio-frequency front-end circuit of claim 24, further comprising:
a receive filter circuit configured to:
accept the radio-frequency receive signal from the other feed of the antenna; and
pass frequencies associated with a receive frequency band.

30. The radio-frequency front-end circuit of claim 29, wherein the receive filter circuit comprises a diplexer.

* * * * *